United States Patent [19]
Katsuragawa

[11] Patent Number: 6,055,215
[45] Date of Patent: Apr. 25, 2000

[54] MAGNETO-OPTICAL RECORDING MEDIUM HAVING A PLURALITY OF FERROMAGNECTIC THIN LAYERS

[75] Inventor: Tadao Katsuragawa, Zama, Japan

[73] Assignee: Ricoh Company, Ltd., Tokyo, Japan

[21] Appl. No.: 09/063,391

[22] Filed: Apr. 21, 1998

[30] Foreign Application Priority Data

Apr. 21, 1997 [JP] Japan ..................................... 9-117626
Mar. 31, 1998 [JP] Japan ................................... 10-103612

[51] Int. Cl.$^7$ ................................................... G11B 11/00
[52] U.S. Cl. ....................................... 369/13; 428/694 ML
[58] Field of Search ............................ 369/13, 14, 110, 369/116; 360/59, 114; 365/122; 428/694 ML, 694 MM

[56] References Cited

U.S. PATENT DOCUMENTS

| | | | |
|---|---|---|---|
| 4,686,661 | 8/1987 | Isaka | 369/13 |
| 5,325,344 | 6/1994 | Ohta et al. | 369/13 |
| 5,430,695 | 7/1995 | Matsumoto | 369/13 |
| 5,862,105 | 1/1999 | Nishimura | 369/13 |

OTHER PUBLICATIONS

Patent Abstracts of Japan, JP 4–132029, May 6, 1992.
Patent Abstracts of Japan, JP 62–119758, June 1, 1987.
Patent Abstracts of Japan, JP 61–89605, May 7, 1986.

*Primary Examiner*—Tan Dinh
*Attorney, Agent, or Firm*—Oblon, Spivak, McClelland, Maier & Neustadt, P.C.

[57] ABSTRACT

A magneto-optical device including a substrate which is transparent to light in a visible spectrum region and a plurality of ferromagnetic layers arranged thereon, each ferromagnetic layer preferably having a width ranging from 5 to 100 nanometers and a thickness ranging from 0.1 to 5 microns. The ferromagnetic layers are parallel to each other and separated by a distance ranging from 0.2 to 2 microns. The ferromagnetic layers are arranged preferably on the side walls of grooves formed parallel to each other in the transparent substrate.

21 Claims, 6 Drawing Sheets

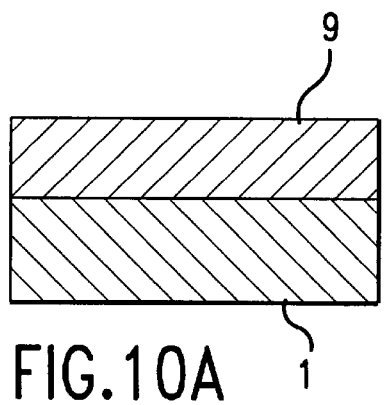
FIG.10A
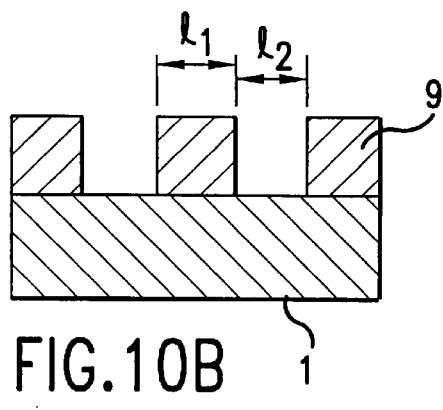
FIG.10B
FIG.10C
FIG.10D
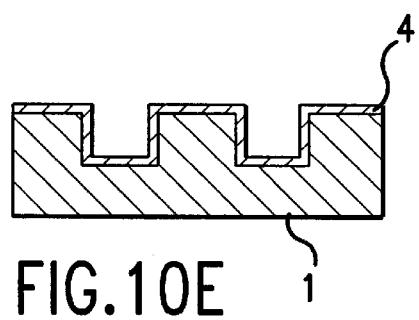
FIG.10E
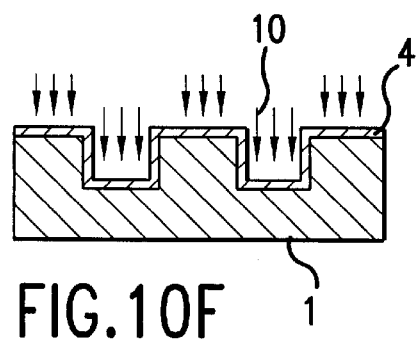
FIG.10F
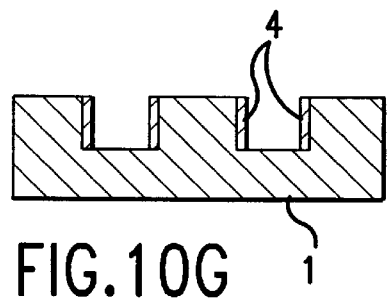
FIG.10G
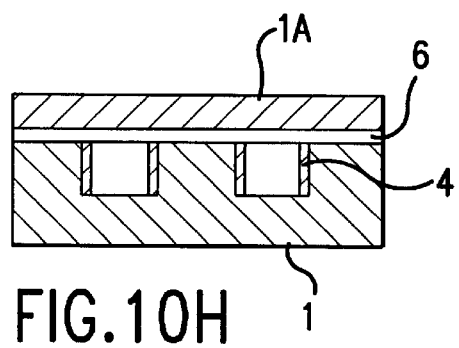
FIG.10H

MAGNETO-OPTICAL RECORDING MEDIUM HAVING A PLURALITY OF FERROMAGNECTIC THIN LAYERS

CROSS-REFERENCES TO RELATED APPLICATION

This application claims priority to Japanese Application No. 9-117626, filed Apr. 21 1997 and Japanese Application No. 10-103612, filed Mar. 31, 1998.

BACKGROUND OF THE INVENTION

1. Field of the Invention

The present invention relates to a magneto-optical device which is highly transparent and capable of repeatedly carrying out recording and reading operations including erasing through magnetic heads. The magneto-optical device may also be used in a polarizer, in a display device for displaying picture images by applying a magnetic field and illuminating light, in a spatial optical modulator and in magnetic field sensor.

2. Description of the Related Art

When linearly polarized light is incident on a magnetized material with its propagation direction parallel to the direction of the magnetization of the magnetized material, the plane of the linear polarization is rotated by the magnetic field, which is well known as the Faraday effect. Utilizing magnetic materials having a relatively large coefficient of the effect, several devices have been fabricated such as magnetic recording media and spatial optical modulator.

As examples of such devices, there disclosed are magnetic recording media (1) using yttrium rare-earth iron garnet and its derivative disclosed in Japanese Laid-Open Patent Application 56-15125/1981, (2) using hexagonal ferrite in Japanese Laid-Open Patent Application 61-89605/1986, (3) a coated magnetic recording medium using yttrium iron garnet particulates in Japanese Laid-Open Patent Application 62-119758/1987 and (4) another coated magnetic recording medium using rare-earth iron garnet particulates in Japanese Laid-Open Patent Application 4-132029/1992.

These magnetic recording media each generally consist of thin layers of either magnetic material or its particulates disposed on a substrate.

Although these media in general have excellent capability of writing and reading various information data, their use has been rather limited to those applications mentioned above. In other words, they are not so advantageous for other applications such as, for example, information display.

SUMMARY OF THE INVENTION

It is an object of the present invention, therefore, to provide a magneto-optical device which is capable of carrying out recording and reading operations including erasing through magnetic heads and which may also be utilized in a polarizer, in a display device for visually displaying picture images by applying magnetic field and illuminating light.

A further object of the present invention is to provide a magneto-optical device which has an excellent response capability to the intensity of applied magnetic field and is therefore capable of visually displaying even slight differences in display contrast caused by minute differences in applied magnetic field strengths.

In a further object of the present invention there is provided a magneto-optical device which may also be used in a spatial optical modulator and in a magnetic field sensor.

According to the present invention, a magneto-optical device is firstly provided, including a substrate and a plurality of thin layers of ferromagnetic material disposed on the substrate. The substrate is preferably transparent in the visible spectral region. The thin layers of ferromagnetic material each preferably have a width of from 5 to 100 nanometers and a thickness of from 0.1 to 5 microns and the plurality of the thin layers each being parallel with one another with a spacing of from 0.2 to 2 microns.

Secondly, a magneto-optical device is provided, characterized in that the thin layers of ferromagnetic material of the magneto-optical device are preferably disposed on side wall portions of a plurality of concave grooves provided parallel with one another on the substrate which is transparent in the visible spectral region.

Thirdly, a magneto-optical device is provided, characterized in that side wall portions of the magneto-optical device for the thin layers of ferromagnetic material to be disposed are preferably perpendicular to the surface plane of the substrate.

Fourthly, a magneto-optical device is provided, characterized in that at least one reflecting layer is further provided on one of the faces of the substrate of the magneto-optical device Fifthly, a magneto-optical device is provided, characterized in that an anti-reflective layer is further provided on the back side of the substrate from the reflecting layer.

Sixthly, a magneto-optical device is provided, characterized in that the thin layers of ferromagnetic material are preferably electrically conductive.

Seventhly, a magneto-optical device is provided, characterized in that the thin layers of ferromagnetic material essentially consist of ultra-fine particles of Fe, Co, Ni or alloy thereof, having an average diameter of from 2 to 20 nanometers.

Eighthly, a magneto-optical device is provided, characterized in that a layer of non-magnetic semiconductive material or metal is further provided in contact with each of the thin layers of ferromagnetic material, having the same thickness as that of the thin layers and a width of from 5 to 10 nanometers.

As described earlier, the magneto-optical device of the present invention includes a substrate which is transparent in the visible spectral region and a plurality of thin layers of ferromagnetic material disposed thereon, each of the thin layers having a width of from 5 to 100 nanometers and a thickness of from 0.1 to 5 microns, being parallel with one another with a spacing of from 0.2 to 2 microns.

The magneto-optical device is therefore capable of achieving both high light transmittance and polarizability by the magneto-optical effect at the same time, to thereby result in a high contrast in transmittance values for visible light, between magnetized and non-magnetized portions. In addition, since these characteristics of the present magneto-optical device enables for picture images to be recorded on large area display panels, the magneto-optical device may be used in display applications. Furthermore, since the device has an excellent response characteristics to the intensity of applied magnetic fields, the device is capable of visually displaying even slight differences in display contrast caused by minute differences in applied magnetic field strengths.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10a–h illustrate the fabrication process steps of the magneto-optical device of the present invention.

DETAILED DESCRIPTION OF THE INVENTION

A magneto-optical device of the present invention has such a basic structure as to include a substrate which is transparent in the visible spectral region and a plurality of thin layers of ferromagnetic material, having a width of from 5 to 100 nanometers and a thickness of from 0.1 to 5 microns and being disposed on the substrate parallel with one another with a spacing of from 0.2 to 2 microns.

Experimentation has been carried out by the inventor concerning to the degree of polarization of the magneto-optical device of the present invention.

When a constant area of the surface of a magneto-optical device is illuminated, it has been found that the degree of polarization increases with the increase in the height of ferromagnetic layers and also with the decrease in the distance between the layers, or with the increase in an aspect ratio (i.e., height of ferromagnetic thin layers /distance between the layers). During the experimentation the polarizability value of more than 40% has been achieved.

Figure 1:
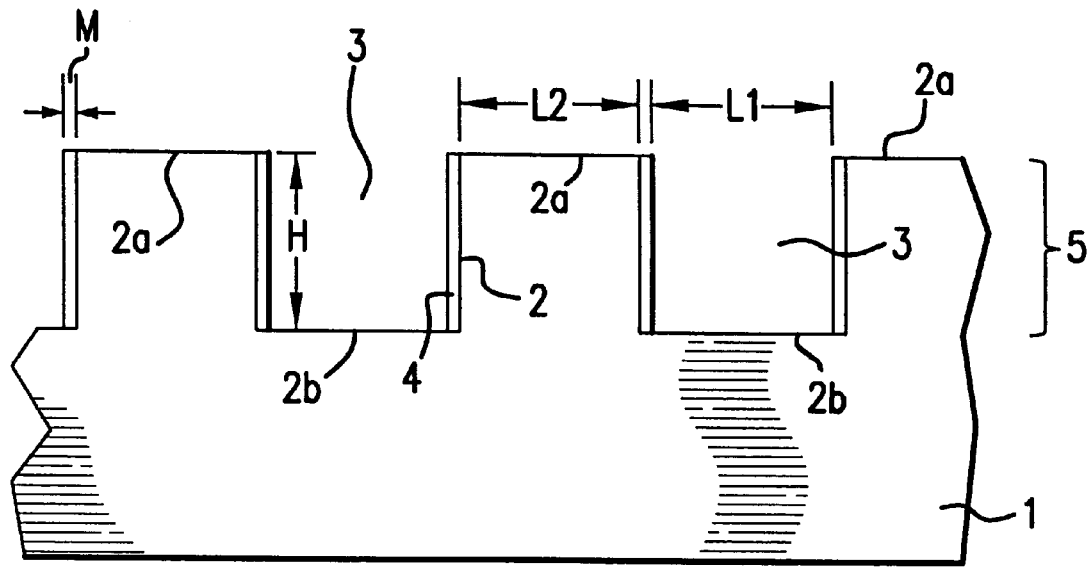
FIG. 1 is an enlarged schematic cross-sectional view of a magneto-optical device according to one embodiment of the present invention.

FIG. 1 is an enlarged cross-sectional view of a magneto-optical device in accordance with one embodiment of the present invention.

Referring to FIG. 1, on a substrate 1 which is transparent in the visible spectral region, a plurality of thin layers 4 of ferromagnetic material are disposed, having a width M of from 5 to 100 nanometers and a height H of from 0.1 to 5 microns, each being parallel with one another with an equal spacing, i.e., L1=L2, of from 0.2 to 2 microns. Furthermore, the thin layers 4 of ferromagnetic material are disposed on side wall portions vertically to the surface plane 2, of a plurality of concave grooves 3 previously formed on the substrate on the substrate.

Figure 2:
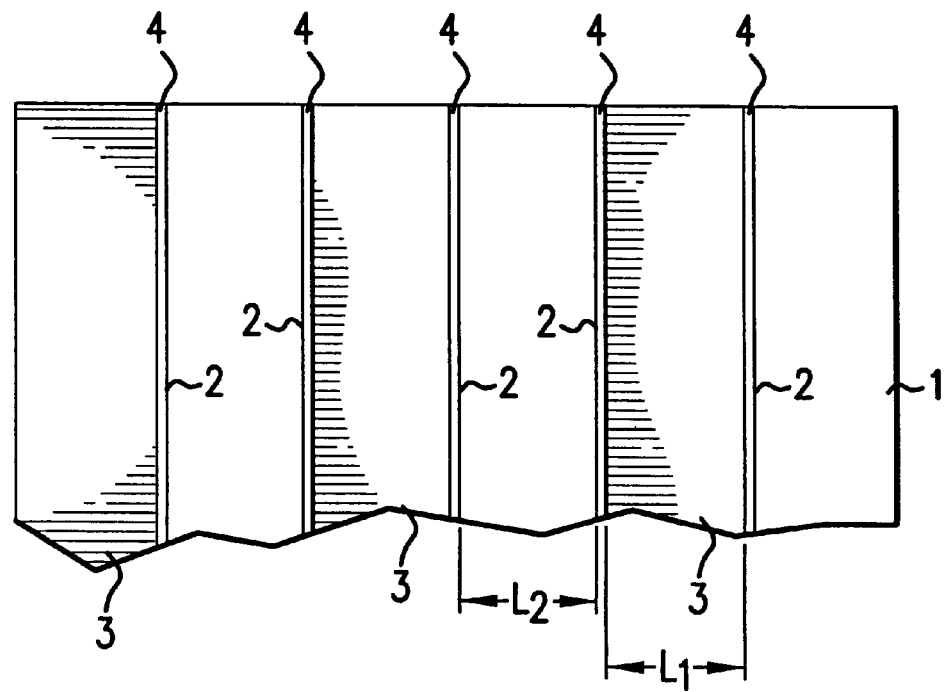
FIG. 2 is an enlarged schematic top view of the magneto-optical device of FIG. 1.

FIG. 2 is an enlarged top view of the magneto-optical device of FIG. 1.

Referring to FIG. 2, on the surface of the substrate 1 which is transparent in the visible spectral region, a plurality of thin layers 4 of ferromagnetic material are disposed on side wall portions perpendicular to the surface plane 2, of a plurality of concave grooves 3.

Figure 3:
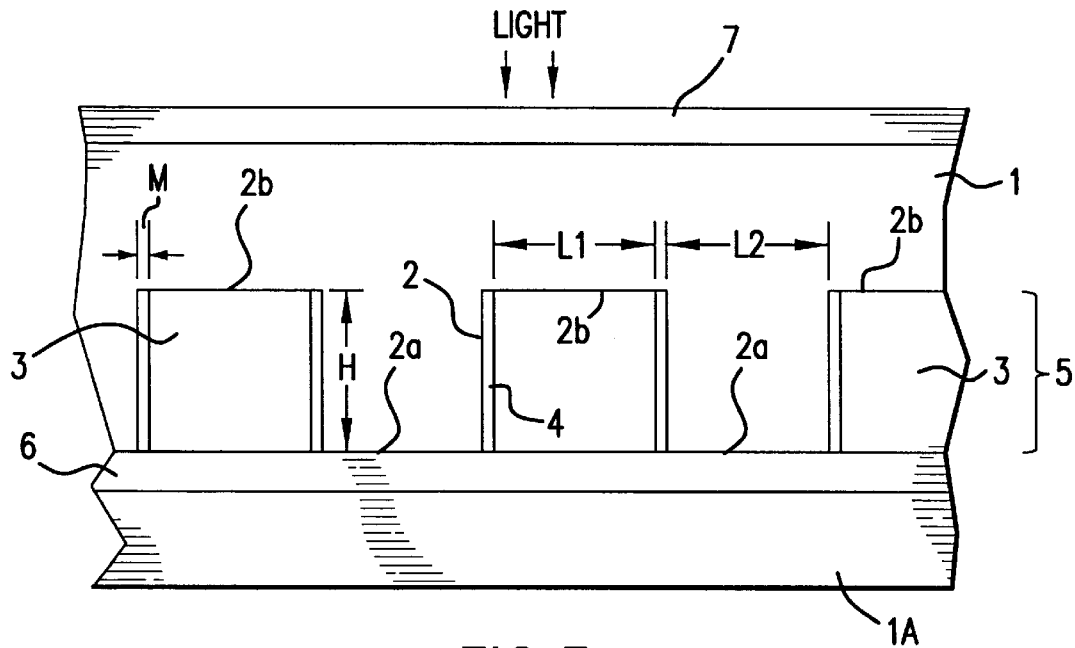
FIG. 3 is an enlarged schematic cross-sectional view of a magneto-optical device according to another embodiment of the present invention.

FIG. 3 is an enlarged (cross-sectional view of a magneto-optical device in accordance with another embodiment of the present invention.

Referring to FIG. 3, on a substrate 1 which is transparent in the visible spectral region, a plurality of thin layers 4 of ferromagnetic material are disposed, having a width M of from 5 to 100 nanometers and a height H of from 0.1 to 5 microns, each being parallel with one another with an equal spacing, i.e., L1=L2, of from 0.2 to 2 microns.

The magneto-optical device further comprises a reflecting layer 6 provided on one of the faces of the substrate of the magneto-optical device. An anti-reflective layer 7 is further provided on the back side of the substrate 1 against the reflecting layer 6.

The reflecting layer 6 may be provided by pasting a reflecting layer which is previously disposed on one of the faces of another substrate 1A, onto the back side of the substrate 1 against the substrate 1.

It is noted in FIGS. 1 and 3 that the numeral 5 represents a plurality of thin layers of ferromagnetic material, which possess, in fact, both polarizing and magnetic capabilities at the same time.

The width M of the ferromagnetic layer 4 is preferably from 5 to 100 nanometers. For the width of less than 5 nanometers, the reduction in the magneto-optical effect of the device results, thereby making it difficult for the magneto-optical device be used in a display. By contrast, for the width of greater than 100 nanometers, the degree of polarizability in the visible spectral region decreases and the transmittance also decreases down to 50% or less, thereby making it also difficult for the magneto-optical device to be used in a display.

The height H of the ferromagnetic layer 4 is preferably from 0.1 to 5 micron. The magnitude of the rotation of the plane of the linear polarization by the magneto-optical effect is related to this height, thereby facilitating more versatile designing for desirable display contrasts of the magneto-optical device For the layer height of less than 0.1 micron, polarization and magnetization effects such as expected to continuous ferromagnetic layers only becomes evident. By contrast, transmittance decreases for the height of greater than 5 microns, thereby making it also difficult for the magneto-optical device be used in a display.

The spacing L between ferromagnetic layers 4 is preferably from 0.2 to 2 microns. For the spacing of less than 0.2 micron, transmittance and the degree of polarizability decrease, thereby making it difficult for the magneto-optical device be used in a display.

By contrast, for the spacing of greater than 2 microns, the polarization effect such as expected to continuous ferromagnetic layers only becomes dominant, thereby making it difficult for the magneto-optical device be used in a display or polarizing device.

Although, as described earlier, the plurality of thin layers of the ferromagnetic material are preferably provided on the side wall portions vertically to the surface plane of the grooves with a width of from 5 to 100 microns and a height of from 0.1 to 5 microns, slight tilt and/or bent of the thin layers are found not to substantially affect to device characteristics.

In place of hollow grooves, the grooves 3 provided on the substrate may also be formed in such a manner that the hollow portions are filled with material which is transparent and has a refractive index different from that of the substrate. Examples of such transparent materials are illustrated in Table 1. When the hollow portions are filled with material with the same refractive index as that of the substrate, neither light diffraction due to interference nor appreciable magneto-optical effect is observed.

Examples of suitable materials for the transparent substrate of the magneto-optical device of the present invention include inorganic materials such as quartz glass, sapphire, crystallized glass, Pyrex glass, $Al_2O_3$, MgO, BeO, $ZrO_2$, $Y_2O_3$, $ThO_3$, GaO, and GGG (Gadolinium Gallium garnet); and transparent films of plastics, such as MMM (methyl methacrylate), PMMA (polymethyl methacrylate), polycarbonate, polypropylene, acrylic resins, styrene resins, ABS(acrylonitrile butadiene styrene) resins, polyallylate, polystyrene, polysulphone, polyether sulphone, epoxy resin, poly-4-methylpentene-1, fluorinated polyimide, fluorine resins, fluororesin, phenoxyresin, polyolefin resins and nylon resins.

These plastic films are advantageous for the device fabrication due to its light weight and flexibility.

The thickness of the transparent substrate suitable for the device is preferably from 50 to 500 microns. As the thickness of the substrate decreases, the substrate becomes more suitable for recording due to reduced distances between a magnetic head and polarization and/or magnetization layer 5. By contrast, for the thickness of greater than 500 microns of the substrate, it also becomes possible to record with a magnetic head from the backside of the device against the reflecting layer 6 in FIG. 3.

As the materials for ferromagnetic thin layer 4 suitable for recording of the present invention, it is preferable for these materials to exhibit high magneto-optical effect, to have magnetic anisotropy in the plane of the ferromagnetic layer and a coercive force value of from 200 to 2000 Oe. In addition, since the polarization and magnetization layer 5 is also capable of acting in a polarizing device, it is essential for the materials of the ferromagnetic thin layers to be electrically conductive to thereby give rise to the transfer of electrons under the electric field of light.

Accordingly, when the ferromagnetic layer consists of insulating materials such as, for example, $Fe_2O_3$, $CoFe_2O_4$, $Bi_2DyFe_{3.8}Al_{1.2}O_{12}$, it is preferable for non-magnetic semiconductor or metal layer be superposed with the insulating materials, to thereby form electron movable layers.

Because of the increase in light absorption with the increase in the thickness of the superimposed layer, the thickness is preferable to be as small as possible for the semiconducting layer. Furthermore, it is also preferable to form the ferromagnetic layers with conductive materials so as to secure the conductive property even without additional conductive layer.

A ferromagnetic thin layer superimposed with non-magnetic semiconductor or metal layers is exemplified in an enlarged cross sectional view of FIG. 4.

Figure 4A:
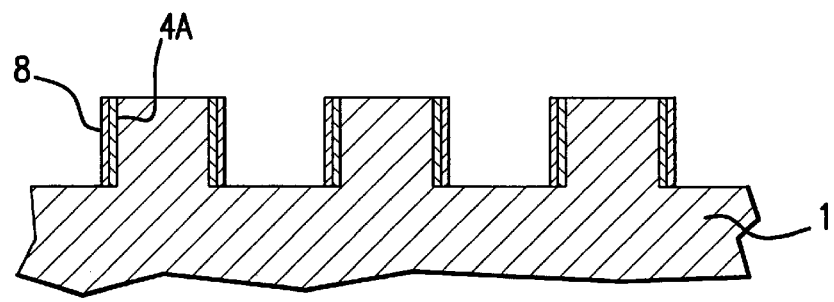
FIG. 4 is an enlarged schematic cross section view of a ferromagnetic thin film layer superimposed with non-magnetic semiconductor or metal layers according to the present invention.
Figure 4B:
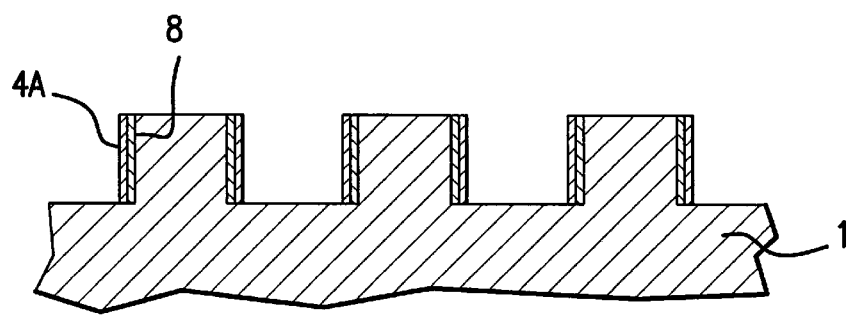

The superposition of the non-magnetic semiconductor or metal layer 8 with the ferromagnetic thin oxide layer 4A can be accomplished either by providing the non-magnetic semiconductor or metal layer 8 on the ferromagnetic thin oxide layer 4A previously disposed on the side walls of the grooves, as shown in FIG. 4a, or by providing the ferromagnetic thin oxide layer 4A on the non-magnetic semiconductor or metal layers 8 previously disposed on the side walls of the grooves, as shown in FIG. 4b.

The ferromagnetic layer is preferably be highly transparent. Examples of materials for ferromagnetic thin layers include conventional transparent ferromagnetic materials. Therefore, it is preferably for the materials to be transparent and to have a large Faraday effect and its coefficient.

Examples of the ferromagnetic thin layers of above-mentioned materials include thin layers comprising ultra-fine particles of ferromagnetic metals such as, for example, iron (Fe), cobalt (Co), nickel (Ni) and alloys thereof, having an average diameter of from 2 to 20 nanometers.

These ferromagnetic layers may be formed by evaporation method, and more preferably by evaporation under rare gas atmosphere mixed with a small amount of air (e.g., several 100 m-Torr) in the evaporation chamber. Through this evaporation process step, the ferromagnetic layer generally include oxygen, carbon and other elements in addition to the above-mentioned principal metallic components.

Although metallic elements such as, for example, iron, cobalt and nickel exhibit large magneto-optical effect, these materials by themselves are generally difficult to be used as the present ferromagnetic layer materials. This difficulty can preferably be overcome in the present invention by the formation of thin layers including ultra-fine particles of the above metals, thereby realizing magneto-optical characteristics large enough for the ferromagnetic layer application of the present invention.

In addition, by controlling the size of, and the distance between the ultra-fine particles formed, respectively, its coercive force value and magnetic anisotropy in the plane of the ferromagnetic layer can be adjusted.

Because of the inclusion of the metallic ultra-fine particles, furthermore, the present ferromagnetic thin layers are highly conductive, to thereby be preferably used by themselves as the ferromagnetic layer materials for the polarization and magnetization layer 5, which may be used in a polarizing device.

In addition to the aforementioned examples, materials suitable for ferromagnetic thin layers of the present invention further include oxides such as rare-earth iron garnet, cobalt ferrite and barium ferrite; materials having large birefringence values, such as $FeBO_3$, $FeF_3$, $YFeO_3$, and $NdFeO_3$; transparent magnetic materials such as MnBi, MnCuBi and PtCo.

Since the magneto-optical effect utilized in the present invention is most effective in the parallel configuration between the directions of light propagation and the magnetic spin orientation, the ferromagnetic materials are preferably disposed so as to have a magnetic anisotropy in the plane of the ferromagnetic layer.

The ferromagnetic thin layers may preferably be formed by PVD (physical vapor deposition) or CVD (chemical vapor deposition) method such as sputtering, evaporation, and MBE (molecular beam epitaxy), and plating method, for example.

As the materials for anti-reflection layer suitable for the magneto-optical device of the present invention, it is preferable for these materials to have high reflectivity in a certain visible spectral region.

Examples for the above materials includes Cu, Al, Ag, Au, Pt, Rh, $TeO_x$, TeC, SeAs, TeAs, TiN, TaN and CrN. Using these materials, the above anti-reflective layer may be formed through the methods such as evaporation, sputtering and ion plating, preferably to a thickness of from 50 to 100 nm. In addition, examples of the anti-reflection layer may further include multiple alternating layers of oxides such as, for example, $SiO_2$ and $TiO_2$, and of metals; a slant viewing type of reflecting plate, and a hologram reflecting plate (Holobrite from Polaroid Japan Co).

In order to improve light transmittance, and to prevent chemical corrosion, and weathering by light irradiation, of the magneto-optical device, an anti-reflective layer is further provided on the back side of the device against the reflecting layer, which is especially preferable when the device is used in a display panel. The anti-reflection layer of the present invention may preferably be disposed through evaporation method using materials such as shown in table 1, for example.

TABLE 1

Refractive Index and Transparent Spectral Region of Thin Layer Materials for Anti-Reflective Layer

| | Thin Layer Material | Refractive Index (Wavelength in nanometers) | | Transparent Spectral Region |
|---|---|---|---|---|
| n < 1.5 | calcium fluoride ($CaF_2$) | 1.23~1.26 | (546) | 150 nm~12 μm |
| | sodium fluoride (NaF) | 1.34 | (550) | 250 nm~14 μm |
| | cryolite ($Na_3AlF_6$) | 1.35 | (550) | <200 nm~14 μm |
| | lithium fluoride (LiF) | 1.36~1.37 | (546) | 110 nm~7 μm |
| | magnesiumfluoride ($MgF_2$) | 1.38 | (550) | 210 nm~10 μm |
| | silicon dioxide ($SiO_2$) | 1.46 | (500) | <200 nm~8 μm |
| 1.5 < | lanthanum fluoride ($LaF_3$) | 1.59 | (550) | 220 nm~>2 μm |
| n < 2 | neodymium fluoride ($NdF_3$) | 1.6 | (550) | 220 nm~>2 μm |
| | aluminum oxide ($Al_2O_3$) | 1.62 | (600) | |
| | cerium fluoride ($CeF_3$) | 1.63 | (550) | 300 nm~>5 μm |
| | lead fluoride ($PbF_2$) | 1.75 | (550) | 240 nm~>20 μm |
| | magnesium oxide (MgO) | 1.75 | (500) | |
| | thorium oxide ($ThO_2$) | 1.8 | (550) | 250 nm~>2 μm |
| | tin oxide ($SnO_2$) | 1.9 | (550) | |
| | lanthanum oxide ($La_2O_3$) | 1.95 | (550) | 350 nm~>2 μm |
| | silicon monoxide (SiO) | 1.7~2.0 | (550) | 500 nm~8 μm |
| 2 < | indium oxide ($In_2O_3$) | 2.0 | (500) | |
| n < 3 | neodymium oxide ($Nd_2O_3$) | 2.0 | (550) | 400 nm~>2 μm |
| | antimony trioxide ($Sb_2O_3$) | 2.40 | (546) | 300 nm~>1 μm |
| | zirconium oxide ($ZrO_2$) | 2.1 | (550) | |
| | cerium dioxide ($CeO_2$) | 2.2 | (550) | 400 nm~10 μm |
| | titanium dioxide ($TiO_2$) | 2.2~2.7 | (550) | 350 nm~12 μm |
| | zinc sulfide (ZnS) | 2.35 | (550) | 380 nm~25 μm |
| | bismuth oxide ($Bi_2O_3$) | 2.45 | (550) | |
| | zinc selenide (ZnSe) | 2.58 | (633) | 600 nm~>15 μm |
| | cadmium sulfide (CdS) | 2.6 | (600) | 600 nm~7 μm |
| 3 < n | antimony sulfide ($Sb_2S_3$) | 3.0 | (589) | 500 nm~10 μm |
| | cadmium telluride (CdTe) | 3.05 | (IR) | |
| | silicon (Si) | 3.5 | | 1.1 nm~10 μm |
| | germanium (Ge) | 4.0 | | 1.7 nm~100 μm |
| | tellurium (Te) | 4.9 | (6 μm) | 3.4 nm~20 μm |
| | lead telluride (PbTe) | 5.5 | | 3.4 nm~30 μm |

Although the magneto-optical device of the present invention has a polarizing capability by itself as aforementioned, the device may further be provided with additional polarizing layer to enhance the polarizing capability.

As the polarizing layer, there may be used conventional polarizing films and highly transparent polarizers using beam splitters. The polarizing films include a perhalogenated film polarizer, dyestuff polarizer, and metal layer polarizer. Either one of these polarizers may preferably used for the magneto-optical device of the present invention. The perhalogenated film polarizer utilizes iodine as the dichromatic material, to thereby result in useful polarizing characteristics relatively independent of light wavelength. Although the dyestuff polarizers have polarizing characteristics not so good as those of the perhalogenated film polarizers, the former polarizers are more durable against heat, light and temperature.

In order to carry out a writing (or recording) operation into the polarization and magnetization layer of the present magneto-optical device, there is used a magnetic head. Since the magnetic head is operated by being placed on either the bottom or the top face of the device, the writing operation into the polarization and magnetization layer can be accomplished without traveling the head at a high speed, which is generally required in the writing operation. This is in much contrast to prior art magnetic memory devices such as, for example, magnetic tapes and magnetic disks.

As the magnetic head of the present invention, a magnetic head may preferably be used, which consists of a plurality of magnetic heads constructed of a tiny bar of soft magnetic material around which thin copper lines are wound and subsequently arranged in matrix. As the magnetic head array preferably used in the present invention, the preferable diameters of the tiny bar and thin copper wire are approximately 100 microns and 20 microns, respectively, and the preferably distance between the magnetic heads in the matrix is approximately 50 microns. The wound thin copper lines are a couple of thin copper lines, and one of which is used for DC for recording, while the other is for AC for magnetizing the heads. For the detection of magnetic fields, the above wound line for DC may preferably be used.

Besides the above-mentioned magnetic head construction, other constructions are also conceivable in the present invention. For example, another magnetic head may comprise a core portion of a soft magnetic material formed by plating method with a coil portions formed by the photolithography techniques, and still another magnetic head may comprise core and coil portions both formed by plating method. The size and distance between the magnetic heads and the manner of winding coils are almost similar to those of the magnetic head array in the above-mentioned fabrication.

Figure 5A:
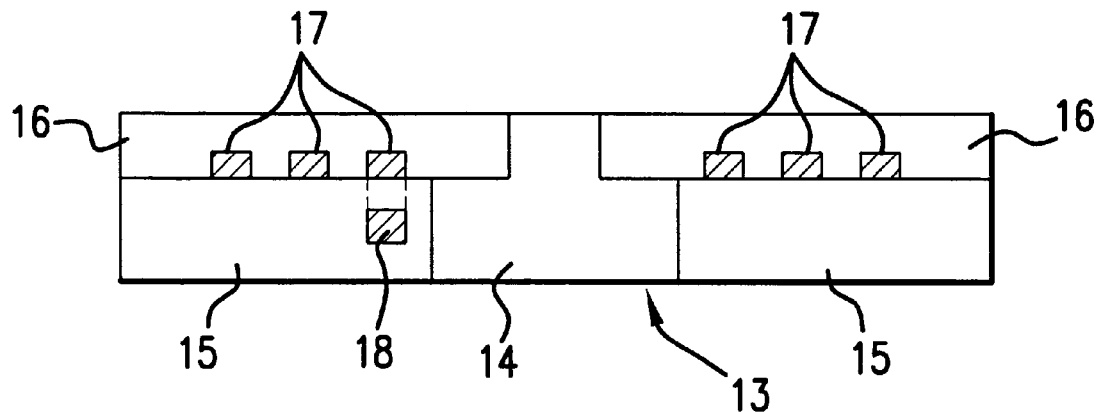
FIG. 5a shows a schematic cross-sectional view of the micro magnetic head in accordance with one embodiment of the present invention.
Figure 5B:
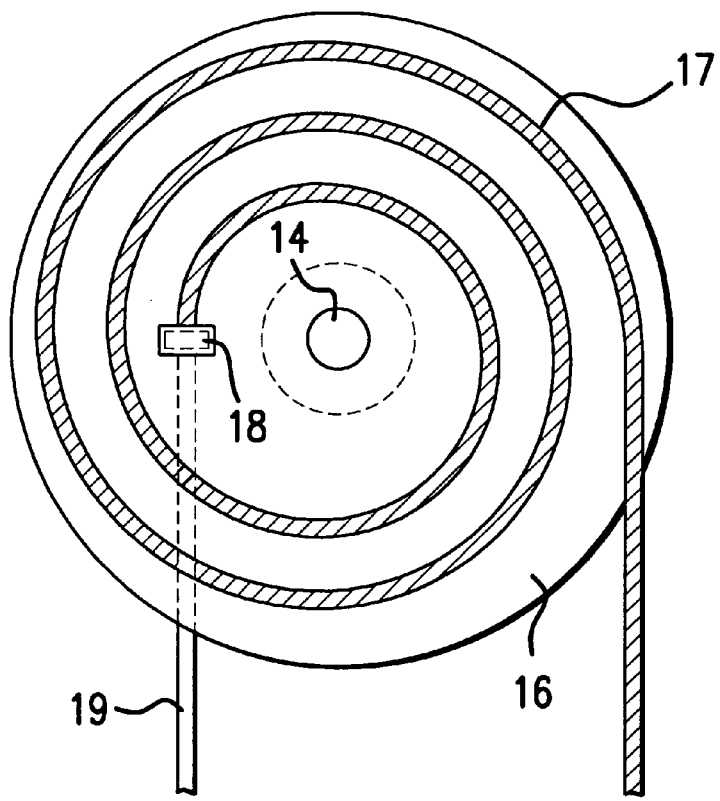
FIG. 5b shows a schematic top-view of the micro magnetic head in accordance with one embodiment of the present invention.

FIGS. 5a and 5b show a micro magnetic head in accordance with one embodiment of the magneto-optical device of the present invention. FIG. 5a is a sectional view of the micro magnetic head and FIG. 5b is a top view of the micro magnetic head. As shown in FIGS. 5a and 5b, a two-dimensional array of the micro magnetic heads may be fabricated by providing a plurality of the micro magnetic heads in a matrix fashion.

Referring to FIG. 5, a micro magnetic head 13 is formed, comprising an Fe Ni disk-shaped magnet 14 (60 micron in diameter), which is provided in the central portion of the head and surrounded by silicon portions 15, having a coil 17 of Au on the silicon portion, which is wound around the top portion of the magnet 14 and is embedded in polyimide resin 16. The coil 17 is then connected to a wiring 19 through a terminal 18.

A plurality of the thus constructed micro magnetic heads 13 may be arranged in a matrix with a distance between the center portions of the micro heads of 120 microns to thereby constitute the array of micro magnetic heads.

The thus prepared micro magnet head array is subsequently provided on the top face of the magneto-optical device. The write operation into the polarization and magnetization layer can be carried out in the present invention by controlling current supplied to each of the micro magnetic heads without traveling a head or at rest in the position of the head relative to the magneto-optical device.

The magneto-optical device having recorded information is then placed between a pair of polarizing films and observed visually under light, to thereby be used in a display panel, for example.

The magneto-optical device of the present invention has an excellent response capability to the intensity of applied magnetic field and is capable of visually displaying even slight differences in display contrast caused by minute differences in applied magnetic field strengths.

Besides the aforementioned magnetic head array, a magnetic pen which is composed of a cylindrical permanent magnet may also be used in the present invention as one of the simplest forms of the magnetic head.

Erasing of image information data recorded in the magneto-optical device may be achieved (1) by removing a permanent magnet from, after having brought close to, the face of the magneto-optical device, or (2) by magnetizing the device in the direction opposite to that for the previous recording.

Figure 6:
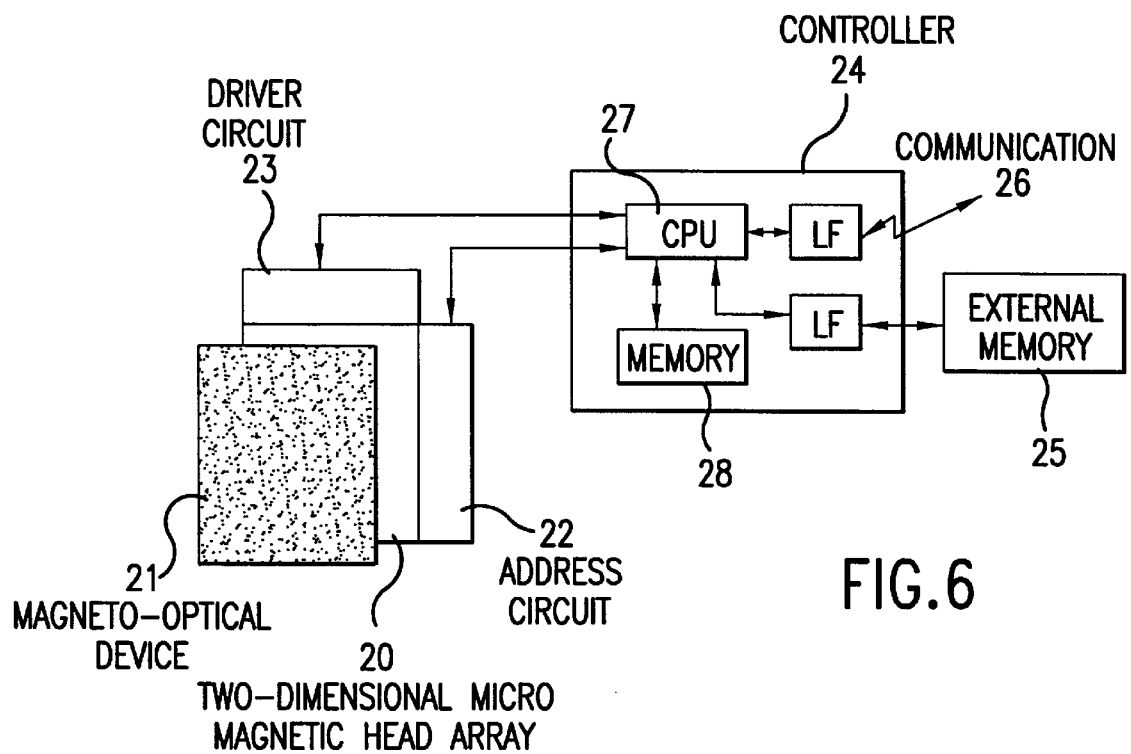
FIG. 6 is a schematic circuit diagram of one embodiment of the magneto-optical device of the present invention for writing and reading using a two-dimensional micro magnetic head array.

FIG. 6 illustrates a circuit schematic in accordance with one embodiment of the magneto-optical device of the present invention, which is configured in a display panel which is capable of recording and erasing information data using the above-mentioned two-dimensional array of micro magnetic heads.

Referring to FIG. 6, a magneto-optical device 21 of the present invention is provided on a two-dimensional array 20 of micro magnetic heads. The two-dimensional micro magnetic head array 20 is constructed of a plurality of the micro magnetic heads of FIG. 5 arranged in matrix.

An address circuit 22 and a driver circuit 23 are further provided, being connected to the micro magnetic head array 20. The address circuit 22 is operated so as to select a line of the micro head array and the driver circuit 23 is to input or to erase information data to each of the heads on the selected line. In addition, a controller 24 (PC or PDA) is connected to control writing and erasing operations of information data.

Information data to be recorded are input to a CPU 27 of the controller 24 through an external memory 25 or a communication line 26 and subsequently stored in a sequential memory 28. During the writing process, the information data are output from the memory 28, sequentially sent through the CPU 27 to the above-mentioned address circuit 22 and driver circuit 23, and then input to the magneto-optical device through the micro magnetic head in the two-dimensional micro magnetic head array 20.

Erasing operation of information data may be carried out, for example, by supplying current in the opposite direction to thereby apply magnetic field in the direction opposite to that for the previous recording.

The recording and erasing operations through the magneto-optical device of the present invention are therefore achieved without traveling a head or at rest in the position of the head relative to the magneto-optical device. Furthermore, by illuminating visible light upon the recorded magneto-optical device, the information data may visually be displayed on the magneto-optical device which is now operated as a display panel.

In addition, although inputting the information data into magneto-optical device can be carried out by the micro magnetic heads of FIG. 5, the input magnetic data into the magneto-optical device can not be output by the micro heads, since there is no change either in relative position between the magneto-optical device and the magnetic heads, or in magnetic flux with time.

Figure 7A:
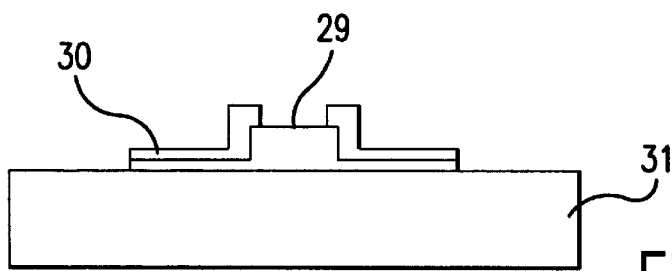
FIG. 7a is a cross sectional view of a reading head according to the present invention.
Figure 7B:
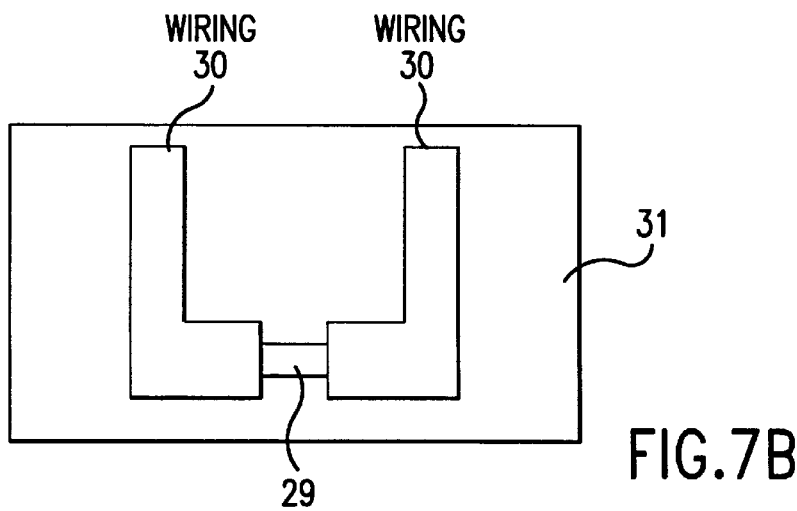
FIG. 7b is a top view of a reading head according to the present invention.

Accordingly, in order to output the magnetic data, a reading head having magnetoresistance effect may preferably be used. FIGS. 7a and 7b illustrate an example of the above-mentioned reading head, wherein FIG. 7a is a cross sectional view and FIG. 7b is a top view of the reading head. Referring FIGS. 7a and 7b, the reading head is composed of a magnetoresistance film 29 formed with layered thin film structure of Ni, Co, Fe, Cu and alloys thereof, with a wiring 30 for the resistance measurement, which is provided on the substrate 31.

With this reading head, the recorded magnetic data can be output by detecting the change in resistance of the magnetoresistance layer caused by magnetic flux from the magneto-optical device. Accordingly, a two-dimensional head array of FIG. 6 is prepared with a plurality of magnetic heads arranged in an array matrix, each of which includes one micro magnetic head of FIG. 5 and one reading head of FIG. 7. By using thus prepared head array, both of writing and erasing the information data can be carried out. The reading of the information data is accomplished by measuring resistance values of the magneto-resistance film with a driver circuit, and then sending the values to CPU and storing into memory.

Figure 8:
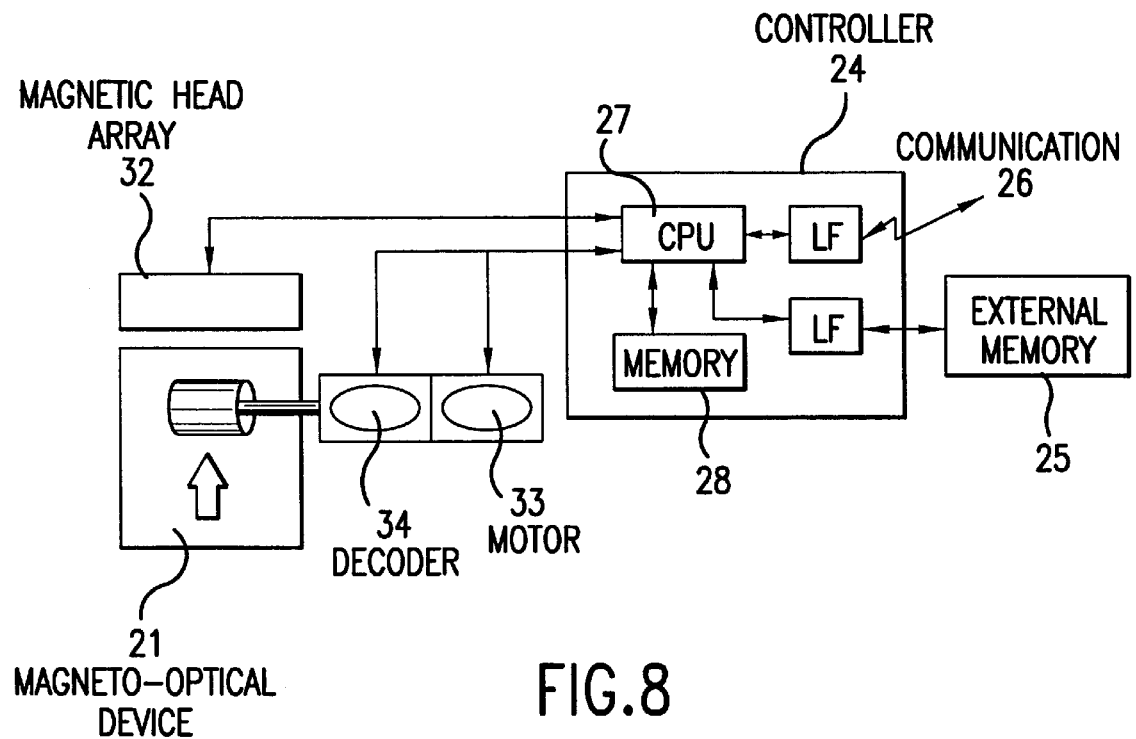
FIG. 8 is a schematic circuit diagram of another embodiment for writing and reading using a one-dimensional micro magnetic head array according to the present invention.

FIG. 8 illustrates another embodiment of the system configuration for carrying out writing and reading information data using a one-dimensional micro magnetic head array 32. CPU 27 drives a motor 33 through a control unit of motor driving, to thereby travel the magneto-optical device relative to the micro magnetic head array. A precise control of the rotation speed of motor 33 is carried out by a decoder 34 provided with the motor 33.

During the operation with this construction, there are caused some variations of relative position between the magneto-optical device and magnetic heads. Therefore, writing and erasing information data are both achieved using the micro magnetic heads of FIG. 5, without further providing a reading head, which is in contrast to the operation using the aforementioned two-dimensional magnetic array.

Although not shown in FIG. 8, another system construction may also be feasible, wherein scanning the magneto-optical device in both of horizontal and vertical directions are carried out by using a micro magnetic head array having a relatively few number of magnetic heads and by translating the array in both horizontal and vertical directions, to thereby carry out writing and erasing operations two-dimensionally in a manner similar to that for the conventional printing operation.

Figure 9:
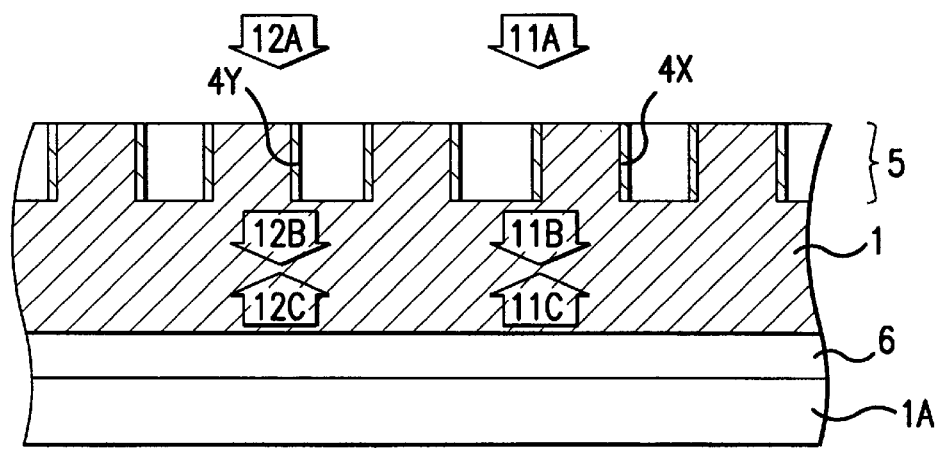
FIG. 9 is a cross sectional view of the magneto-optical device of the present invention, which illustrates the manifestation of contrast when the magneto-optical device of the present invention is used in a display device.

FIG. 9 is a cross sectional view of the magneto-optical device of the present invention herewith included to illustrate the manifestation of contrast when the magneto-optical device is used in a display device.

Referring to FIG. 9, the magneto-optical device comprises a plurality of polarization and magnetization layer 5 having the ferromagnetic material disposed on the side wall portions perpendicular to the surface plane 2, of a plurality of concave grooves 3 provided on the substrate 1 which is transparent in the visible spectral region, and a reflecting layer 6 disposed on the back side of the substrate against the grooves, as described earlier. The ferromagnetic polarization and magnetization layer 5 has magnetized and non-magnetized potions 4X and 4Y, respectively.

A couple of light beams 11A and 12A incident on the magneto-optical device are assumed. The light beam 11 A is circularly polarized, and the light beam turns to linearly polarized light 11B after passing through the magnetized portion 4X. The light beam 11B is then reflected by the reflecting layer 6 to be a light beam 11C and passes through the magnetized portion 4X again. Since the plane of the polarization of the light beam 11C has been rotated from that of 11B and the magnetized portion 4X acts as a polarizer, the beam 11C can not go through the portion 4X.

In similar manner, the light beam 12A is also circularly polarized and the light beam turns to linearly polarized light 12B after passing through the non-magnetized portion 4Y. The light beam 12C is reflected back as a beam 12C by the reflecting layer 6, and passes through the non-magnetized portion 4Y. By contrast to the light beam 11C above, however, the plane of the polarization of the light beam 12C has not been rotated by the non-magnetized portion 4Y and is coincident to the plane of the polarization of the magnetization and polarization layer 5. Therefore, the beam 12C can therefore go through the portion 4Y. Accordingly, the light intensity which passes through these portions is determined by the magnitude of magnetization of the ferromagnetic portion of the ferromagnetic thin layers.

Therefore, the magnetized portions of the ferromagnetic thin layer appears dark, whereas the non-magnetized portions appears light.

Such magneto-optical device as described above may therefore be used also in a polarizer. Furthermore, since pattern images may be formed, changed and erased modified on the magneto-optical device at will, the device may be used in a display panel even without a back-light illumination.

Furthermore, the magneto-optical device of the present invention may also be used in a spatial modulator. The spatial modulator is fabricated, for example, as follows.

A plurality of solenoids having an inner diameter of approximately 100 microns are prepared. These solenoids are then arranged in a matrix and connected so that each is individually supplied by current for magnetization. The solenoid matrix thus prepared is provided, for example, directly on the magneto-optical device as shown in FIG. 1, and this structure is further placed between a pair of polarizers, to thereby be operated as a spatial modulator by controlling the current supplied to each of the solenoids. It is noted, since a magnetic spin flop caused by reversing the solenoid current flow takes place within several nanoseconds with this structure, a high speed spatial modulation may be achieved, to thereby accomplish high speed switching of light beams and the use of the present magneto-optical device in a high speed spatial modulator.

In addition, it is also noted, since the magnitude of magneto-optical effect depends on that of ferromagnetic thin layer formed on side walls of the grooves, the magneto-optical device of the present invention may also be used in a magnetic field sensor.

The method of fabricating the magneto-optical device of the present invention includes the process steps of:

(1) forming a plurality of substantially linear concave grooves being parallel with one another on a substrate which is transparent in the visible spectral region using photolithography techniques;

(2) disposing a thin layer of ferromagnetic material on the substrate;

(3) removing the portions of the ferromagnetic layer on the substrate using the etching techniques, such that the portions of the ferromagnetic layer only on side walls of the grooves are retained, to thereby form stripes of thin layers of ferromagnetic material;

(4) carrying out the formation, and succeeding surface polishing of a layer of inorganic material, when relevant, which is further provided, for example, by sputtering process to fill up the grooves and to thereby obtain a smoothed surface;

(5) when relevant, providing a light reflecting layer on one of faces of the substrate of the magneto-optical device, or pasting another transparent plate onto one of faces of the substrate, which is previously provided with a light reflecting layer thereon; and (6) providing, when relevant, an anti-reflective layer on the back face of the substrate against the light reflecting layer.

FIG. 10 illustrates fabrication process steps of the magneto-optical device of the present invention.

A layer of a photoresist material 9 is firstly disposed on a transparent substrate (a). After providing thereon with a mask having a plurality of narrow lines being parallel with one another, the resultant layer is exposed to ultraviolet light, and subsequently wet etched to obtain a photoresist mask having a pattern of narrow parallel lines, having a width of $1_1$ and a spacing of $1_2$ (b). The transparent substrate is then etched to thereby a plurality of parallel concave grooves 3 are formed (c), and the mask is removed upon the completion of the etching process step (d).

Through the above-mentioned steps, a plurality of grooves may be formed with relative ease, having a large depth vertically to the surface of the substrate (up to about 10 microns). In addition, by the photolithography techniques also, the grooves can be formed having linear and smoothed edges.

When a transparent film of plastic material are used as a substrate, a thin layer of, for example, $SiO_2$ is disposed on the plastic film through the PVD techniques beforehand, and grooves may be formed on the $SiO_2$ portions of the substrate.

Subsequently, a thin layer 4 of ferromagnetic material is formed on the grooved substrate (e). Methods for forming the thin layer preferably includes but not limited to PVD, CVD and plating.

The thus formed ferromagnetic layer is then subjected to a sputtering process step using Ar ions 10 to remove the portions of the ferromagnetic layer on horizontal faces of the grooved substrate (f), to thereby form a plurality of thin layers 4 of ferromagnetic material (g). Although the method for the removal also includes dry and wet methods, the above-mentioned Ar ion sputtering may preferably be used over other methods, wherein the sputtering is preferably carried out under the reverse biased condition at a negative voltage applied to a substrate electrode.

A light reflecting layer is formed on a transparent plate 1 A and the resultant structure is pasted on the grooved face of the substrate of the magneto-optical device, whereby a magneto-optical device of the present invention is fabricated (h).

EXAMPLES

The following examples are provided further to illustrate preferred embodiments of the invention.

EXAMPLE 1

A substrate of quartz was provided having a thickness of 1 mm. On the surfaces of the substrate, a layer of $Cr_2O_3$ and thereon a layer of Cr were formed on the substrate, having a total layer thickness of 120 nanometers. In addition, a layer of a photoresist material of the positive type was further provided thereon.

A resultant layer accumulated as above was then subjected to the conventional photolithography techniques for forming a plurality of narrow lines being parallel to with one another. During the photolithography process step, the resultant layer was exposed to ultraviolet light using a photoresist mask for narrow parallel lines to be formed, having L1=L2=1.0 micron (FIG. 1), and subsequently subjected to a wet etching process step.

The thus formed pattern of the resultant layer on the substrate was used as a second mask. Using the second mask, the quartz substrate was etched under a fluorine gas ambient, to thereby form a plurality of parallel concave grooves having the depth of 0.65 micron (H in FIG. 1). Upon the completion of the etching, the second mask was removed from the substrate surface.

Subsequently, a layer of ultra-fine particles of iron was disposed on the grooved quartz substrate by an evaporation method under gaseous atmosphere without heating the substrate. The gaseous atmosphere was argon flowing into the evaporation chamber at a rate of 50 sccm and the total pressure of 1.0 Pa. The layer of ultra-fine iron particles thus formed was found to have a thickness of approximately 90 nanometers.

The diameter of the iron ultra-fine particles was measured using a transmission electron microscope and found approximately 6 nanometers on the average. When the iron particle layer was investigated with x-ray photoelectron spectroscopy (XPS) technique, XPS spectra showed that the layer consisted of 66% of iron with additional elements such as, oxygen, carbon and nitrogen.

During the above evaporation process, another flat quartz plate was mounted in the evaporation apparatus adjacent to the above-mentioned quartz substrate, onto which for ultra-fine particles of iron to be evaporated under the identical conditions as those for the grooved quartz substrate. The magnetic characteristics of an iron particle layer on the flat quartz plate were measured to find a coercive force of 32 Oe, a squareness ratio of 0.80 and a magnetic anisotropy present in the plane surface of the quartz substrate.

The grooved quartz substrate with the iron particle layer was then subjected to a sputtering process step as follows. Using a sputtering apparatus which was operated under nitrogen atmosphere and at −400 Volts applied to a substrate electrode (i.e., under the reverse biased condition), the portions of the iron particle layer previously present on horizontal faces (2a and 2b in FIG. 1) of the grooved substrate were removed, thereby forming a plurality of thin layers of ultra-fine particles of iron, which were retained only on the vertical portions (the side walls 2 in FIG. 1) of the substrate with the thin layers being parallel with one another. The layer thus prepared with a plurality of thin layers of ultra-fine particles of iron are hereinafter referred to as a striped thin ferromagnetic layer.

In addition, an antireflective layer of Mg $F_2$ (n=1.38) was formed on the back side of the substrate by vacuum evaporation with a thickness of approximately 100 nanometers, whereby constituting a magneto-optical device of the present invention. With this antireflective layer, the light reflectivity of the device in the visible region was reduced by about 3%.

The optical characteristics of the striped thin ferromagnetic layer was subsequently measured. Assuming s- and p-components of polarized light to have the plane of its electric vector perpendicular and parallel to the surface plane of the ferromagnetic layer, respectively, the striped thin ferromagnetic layer plane was found to have intensity transmission coefficients at wavelength of 600 nanometers, of equal to or greater than 50% for s-component and equal to or less than 4% for p-component. From these values presently measured, the degree of polarization $(T_1-T_2)/(T_1+T_2)$ at 600 nanometers was obtained as 86%, which is indicative of possible use of the striped thin ferromagnetic layer in a polarizing unit as well.

Portions of the striped thin ferromagnetic layer were magnetized by, for example, drawing characters with a thin bar magnet of approximately 1 mm in diameter, on the side of the coated antireflective layer of the grooved substrate. The ferromagnetic layer was subsequently placed between a pair of polarizing films and observed visually. As a result, a dark appearance of the magnetized portions were observed, which corresponds to the rotation of the plane of linearly polarized light by the Faraday effect upon the passage through the ferromagnetic layer and resultant shading of the light by the polarizing films. By contrast, no shading was observed for non-magnetized portions without the influence of the Faraday rotation effect. Accordingly, characters previously written into the ferromagnetic layer were found clearly legible with a satisfactory contrast.

Furthermore, another magneto-optical device was prepared in a similar manner as above with the exception that a layer of aluminum was provided as a light reflecting layer in place of one of the polarizing layers on the side of the substrate on which the ferromagnetic layer along the grooves was formed.

When the portions of the striped thin ferromagnetic layer were subsequently magnetized by drawing characters with a thin bar magnet in a similar manner as above, the characters were found clearly legible with a satisfactory contrast under light reflected from the light reflecting layer.

EXAMPLE 2

A magneto-optical device was fabricated by repeating the procedure of Example 1 with the exception that a magnetic oxide layer was disposed by sputtering a $Bi_2Gd\ Fe_4AlO_{12}$ target on the grooved quartz substrate heated at approximately 300° C. to a thickness of 57 nanometers on the horizontal faces of the grooved substrate, in place of the iron particle layer formed by the evaporation method of Example 1.

The thus disposed magnetic oxide layer was subjected to annealing process step at 650° C. for 3 hours. When the magnetic characteristics of the magnetic oxide layer was measured, the value of the coercive force of 540 Oe was obtained on flat portions of the layer.

A layer of Ge was then disposed by sputtering on the grooved side of the quartz substrate to a thickness of 8 nanometers without heating the substrate at a pressure of 6.7×10 Torr and with an input power of 200 W. Subsequently, the portions of the Ge layer on horizontal faces of the grooved substrate were removed by the reversed biased sputtering in a similar manner to Example 1.

When the portions of the magnetic oxide layer were subsequently magnetized by drawing characters with a thin bar magnet and observed visually in a similar manner as Example 1 described earlier, the characters were found clearly legible with a satisfactory contrast.

By contrast, when another device was prepared in similar manner as above except the Ge layer, no characters were found legible.

EXAMPLE 3

An array of micro magnetic heads as shown in FIGS. 5a and 5b was prepared as follows. The array included a plurality of the micro magnetic heads 13 provided in a matrix on a 0.5 micron thick silicon wafer through the photolithography techniques.

Each of the micro magnetic heads 13 comprised of an FeNi disk-shaped magnet 14 of 60 micron in diameter, which was provided in the central portion of the head and surrounded by silicon portions 15, having a seven-turn coil of Au 17, which was wound around the tip portion of the magnet 14 and was embedded in polyimide resin 16.

A plurality of the thus constructed micro magnetic heads were arranged in a lattice with a distance of 120 microns to thereby constitute the array of micro magnetic heads.

The thus prepared micro magnetic head array was then provided on the anti-reflective layer of the magneto-optical device fabricated in Example 1.

The portions of the thin ferromagnetic layer of the magneto-optical device were then magnetized by controlling current supplied to each of the micro magnetic heads to thereby write characters in the ferromagnetic layer.

The magneto-optical device was subsequently placed between a pair of polarizing films and observed visually. As a result, a dark appearance of the magnetized portions were observed, which corresponds to the rotation of the plane of linearly polarized light by the Faraday effect upon the passage through the ferromagnetic layer and resultant shading of the light by the polarizing films. By contrast, no shading was observed for non-magnetized portions without the influence of the Faraday rotation effect. Accordingly, characters previously written into the ferromagnetic layer were found clearly legible with a satisfactory contrast.

For the magneto-optical device fabricated as above, writing and displaying image information utilizing the ferromagnetic layer have become feasible as described earlier, by simply controlling the current supplied to each micro magnetic head without any translation or displacement of the magnetic head array relative to the magneto-optical device.

In addition, by carrying out the writing and displaying image information consecutively, displaying visually moving picture images is also feasible by the device.

Furthermore, reading magnetic images is also feasible with the simultaneous use of an ac magnetization coil and a dc detection coil, as described earlier.

Comparative Example 1

A continuous, or not particulate, ferromagnetic layer of iron was disposed on a flat surface of quartz substrate to a thickness of 67 nanometers by evaporation method. The transmission coefficient of the layer in the visible region was found to be equal to or less than 40%, resulting visually in a dark appearance and no legible display images.

Comparative Example 2

A couple of continues magnetic oxide layers were disposed on a flat surface of a 1 mm thick quartz substrate by sputtering in similar manner to Example 2, one to a thickness of 100 nanometers and other to 900 nanometers. Both layers were found to have a yellowish appearance, having transmission coefficients of approximately 80% in red spectral region, whereas 30% or less in the region 500 nanometers or less.

The portions of the thus prepared magnetic oxide layer were subsequently magnetized by drawing characters with a thin bar magnet and placed between a pair of conventional polarizing films to be observed visually.

As a result, no image was found legible for the 100 nanometers thick magnetic oxide layer. In addition, for the 900 nanometers thick layer, although images were legible in the transmission mode, no image was observed in the reflection mode (or the device construction with a reflecting layer provided on one of the surfaces of the substrate).

Advantages of the Invention

According to claims 1 and 2, the magneto-optical device of the present invention includes a substrate which is preferably transparent in the visible spectral region and a plurality of thin layers of ferromagnetic material disposed thereon, each of the thin layers preferably having a width of from 5 to 100 nanometers and a thickness of from 0.1 to 5 microns, and being parallel with one another with a spacing of from 0.2 to 2 microns.

The magneto-optical device is, therefore, capable of achieving both high light transmittance and refractivity by magneto-optical effect at the same time, to thereby result in a high contrast in transmittance values of visible light between magnetized and non-magnetized portions, which is satisfactory for large area display panels. In addition, since the magneto-optical device has also an excellent response characteristics to the intensity of applied magnetic field, the device is capable of visually displaying even slight differences in display contrast caused by minute differences in applied magnetic field strengths.

The magneto-optical device of claim 4 is provided with a light reflecting layer. The magneto-optical device is therefore capable of exhibiting an excellent contrast in transmittance of visible light between magnetized or non-transmittable portions of, and non-magnetized or transmittable portions of the device, to be used in a reflection type display.

The magneto-optical device of claim 5 is provided further with an anti-reflection layer. The light transmittance of the device is increased, to thereby displaying picture images with a higher contrast.

The magneto-optical device of claim 6 is fabricated so as for its ferromagnetic layer to be electrically conductive. The ferromagnetic layer of the device is therefore composed of the ferromagnetic layer by itself, having both of the polarization and magnetization capabilities, without providing any additional layer otherwise necessitated to gives rise to the electron transfer in the layer.

The ferromagnetic layer of the magneto-optical device of claim 7 is composed of ultra-fine particles of materials such as Fe, Co, Ni and alloys thereof, which exhibit relatively large Faraday effects. The device, therefore, has a high transmittance as well as the large Faraday effect, and picture images of high contrast may be displayed by the device.

According to claim 8, when a ferromagnetic layer of the magneto-optical device is non-conductive, the ferromagnetic layer is superimposed with non-magnetic semiconductor or metal layers. The non-conductive ferromagnetic layer is therefore provided with polarization characteristics, thereby for the layer to be formed having both of the polarization and magnetization capabilities.

Description of the Reference Numeral

1 A substrate which is transparent in the visible spectral region.
2 A side wall of concave grooves.
3 A plurality of liner grooves provided in parallel with one another.
4 A thin layer of ferromagnetic material.
4A A thin layer of ferromagnetic oxide.
4X A magnetized portion of the thin layer of ferromagnetic oxide.
4Y A non-magnetized portion of the thin layer of ferromagnetic oxide.
5 A polarization and magnetization layer.
6 A light reflecting layer.
7 An anti-reflection layer.
8 A non-magnetic semiconductor or metal layer.
9 A photoresist layer.
10 Ar ions.
11A Circularly polarized light.
11B A light beam after passing through a magnetized portion 4X of the thin layer of ferromagnetic material.
11C A light beam reflected by a reflecting layer.
12A Circularly polarized light.
12B A light beam after passing through a non-magnetized portion 4Y of thin layer of ferromagnetic material.
12C A light beam reflected by a reflecting layer.
13 A micro magnetic head.
14 A disk-shaped magnet.
15 A silicon portion.
16 Polyimide resin.
17 A coil.
18 A terminal.
19 A wiring.
20 A two-dimensional array of micro magnetic heads.
21 A magneto-optical device.
22 A address circuit.
23 A driver circuit.
24 A controller.
25 An external memory.
26 Communication.
27 A CPU.
28 A memory.
29 A magnetoresistance layer.
30 A wiring.
31 A substrate.
32 A one-dimensional array of micro magnetic heads.
33 A motor.
34 A decoder.

What is claimed as new and desired to be secured by Letters Patent of the United States is:

1. A magneto-optical device comprising:
   a substrate transparent to light in a visible spectral region;
   a plurality of ferromagnetic layers having a width in an inclusive range of 5 through 100 nanometers and a thickness in an inclusive range of 0.1 through 5 microns;
   wherein said ferromagnetic layers are parallel to each other and separated by a distance in an inclusive range of 0.2 through 2 microns.

2. The magneto-optical device of claim 1, wherein said substrate defines grooves having side walls, said ferromagnetic layers being arranged on said side walls.

3. The magneto-optical device of claim 2, wherein said side walls are perpendicular to a surface of said substrate.

4. The magneto-optical device of claim 1, further comprising a reflecting layer on a first face of said substrate.

5. The magneto-optical device of claim 4, further comprising an anti-reflecting layer on a second face of said substrate.

6. The magneto-optical device of claim 1, wherein said ferromagnetic layers are electrically conductive.

7. The magneto-optical device of claim 6, wherein said ferromagnetic layers comprise particles of a member of the group consisting of Fe, Co, Ni, FeCo alloys, FeNi alloys and CoNi alloys.

8. The magneto-optical device of claim 7, wherein said ferromagnetic layers have an average diameter in an inclusive range of 2 through 20 nanometers.

9. The magneto-optical device of claim 1, further comprising a layer of non-magnetic semiconducting material or metal in contact with said ferromagnetic layers and having a same thickness as the thickness of the ferromagnetic layers and a width in an inclusive range of 5 through 10 nanometers.

10. The magneto-optical device of claim 2, further comprising a reflecting layer on a first face of said substrate.

11. The magneto-optical device of claim 10, further comprising an anti-reflecting layer on a second face of said substrate.

12. The magneto-optical device of claim 2, wherein said ferromagnetic layers are electrically conductive.

13. The magneto-optical device of claim 12, wherein said ferromagnetic layers comprise particles of a member of the group consisting of Fe, Co, Ni, FeCo alloys, FeNi alloys and CoNi alloys.

14. The magneto-optical device of claim 13, wherein said ferromagnetic layers have an average diameter in an inclusive range of 2 through 20 nanometers.

15. The magneto-optical device of claim 2, further comprising a layer of non-magnetic semiconducting material or metal in contact with said ferromagnetic layers and having a same thickness as the thickness of the ferromagnetic layers and a width in an inclusive range of 5 through 10 nanometers.

16. The magneto-optical device of claim 3, further comprising a reflecting layer on a first face of said substrate.

17. The magneto-optical device of claim 16, further comprising an anti-reflecting layer on a second face of said substrate.

18. The magneto-optical device of claim 3, wherein said ferromagnetic layers are electrically conductive.

19. The magneto-optical device of claim 18, wherein said ferromagnetic layers comprise particles of a member of the group consisting of Fe, Co, Ni, FeCo alloys, FeNi alloys and CoNi alloys.

20. The magneto-optical device of claim 19, wherein said ferromagnetic layers have an average diameter in an inclusive range of 2 through 20 nanometers.

21. The magneto-optical device of claim 3, further comprising a layer of non-magnetic semiconducting material or metal in contact with said ferromagnetic layers and having a same thickness as the thickness of the ferromagnetic layers and a width in an inclusive range of 5 through 10 nanometers.

* * * * *